United States Patent [19]
Holden et al.

[11] Patent Number: 5,812,623
[45] Date of Patent: Sep. 22, 1998

[54] SELF-ALIGNING ABSORBER TUBE FOR A CONTROL ROD IN A NUCLEAR REACTOR

[75] Inventors: James E. Holden; Kevin L. Ledford; Richard D. Wittmeier; Justin L. Banks; Mark C. Clark, all of Wilmington, N.C.

[73] Assignee: General Electric Company, Schenectady, N.Y.

[21] Appl. No.: 655,891

[22] Filed: May 31, 1996

[51] Int. Cl.⁶ .................................................. G21C 21/18
[52] U.S. Cl. .......................... 376/260; 376/327; 29/514; 29/890.038; 228/135; 228/174
[58] Field of Search .................... 376/327, 333, 376/334, 335, 260; 228/6.1, 44.3, 183, 184, 151, 173.4, 135, 137, 174, 150, 153; 122/6 A, 512; 29/890.038, 890.043, 514; 219/105

[56] References Cited

U.S. PATENT DOCUMENTS

| | | | |
|---|---|---|---|
| 1,158,307 | 10/1915 | Schmidt | 228/135 |
| 1,339,970 | 5/1920 | Murray, Jr. et al. | 29/471.1 |
| 1,774,150 | 8/1930 | Murray | 228/135 |
| 1,999,818 | 4/1935 | McIntyre | 29/156 |
| 2,998,640 | 9/1961 | Huet | 29/157.4 |
| 3,268,248 | 8/1966 | Chambers | 285/286 |
| 3,293,403 | 12/1966 | Rudd | 219/104 |
| 3,357,083 | 12/1967 | Wiehn et al. | 29/157.3 |
| 3,407,117 | 10/1968 | Lichtenberger | 376/333 |
| 3,585,709 | 6/1971 | Muller et al. | 29/472.3 |
| 3,712,852 | 1/1973 | Fisher | 376/333 |
| 4,861,544 | 8/1989 | Gordon . | |
| 4,980,535 | 12/1990 | Aiello et al. . | |
| 5,225,151 | 7/1993 | Bernander et al. | 376/333 |
| 5,249,818 | 10/1993 | Patterson | 280/281.1 |
| 5,348,212 | 9/1994 | Galanes | 228/135 |
| 5,505,365 | 4/1996 | Olsen | 228/135 |

FOREIGN PATENT DOCUMENTS

| | | | |
|---|---|---|---|
| 0015592 | 1/1985 | Japan | 376/327 |
| 0228991 | 11/1985 | Japan | 376/327 |
| 3015194 | 1/1988 | Japan | 376/327 |
| 1148996 | 6/1989 | Japan | 376/327 |
| 0055439 | 11/1989 | Japan | 376/327 |
| 4215097 | 8/1992 | Japan | 376/327 |

*Primary Examiner*—Harvey E. Behrend
*Attorney, Agent, or Firm*—Nixon & Vanderhye P.C.

[57] ABSTRACT

A control rod assembly for a nuclear reactor, wherein a plurality of absorber tubes are arranged and welded in a side-by-side array, the improvement wherein each absorber tube is formed with an elongated slot extending substantially the entire length of the absorber tube on one side of the tube, and with an elongated tab extending substantially the entire length of the absorber tube on a diametrically opposed side of the tube such that, for adjacent absorber tubes, a joint is formed wherein the tab of one tube is located within the slot of the other.

5 Claims, 5 Drawing Sheets

SELF-ALIGNING ABSORBER TUBE FOR A CONTROL ROD IN A NUCLEAR REACTOR

TECHNICAL FIELD

This invention relates to control rod construction for a nuclear reactor and specifically, to a tab and slot design used to provide initial alignment and potential structural benefits between adjacent absorber tubes.

BACKGROUND

Traditional assembly techniques for control rod constructions necessarily involves alignment of a plurality of absorber tubes in side-by-side relationship prior to welding. Typically, rollers are utilized to align the tubes with enough accuracy for laser welding. Newer tube designs, however, have different geometries which respond differently to the conventional fixturing. The weld prep alignment becomes more difficult as designs vary, and more expensive fixturing may be required to prevent tube misalignment and to reduce fixture pressure on the tube.

The tube alignment problem is compounded by weld penetration requirements. The tube must be aligned with sufficient accuracy for a consistent weld joint and to provide material for weld penetration. Current tube design requires a helium plenum between adjacent tubes. Although this plenum serves other functions in the design, one function is to provide the proper configuration for the backside of the weld. Newer tube designs have been proposed which limits the plenum volume. In trying to achieve proper weld penetrations, increased porosity, weld drift through the tube wall and inconsistent weld penetration can occur.

Current control rods use "square"-shaped absorber tubes which are laser welded in side-by-side relationship to form tube panels. The absorber tubes are, in fact, round but the exterior is formed with four equidistant lobes which give the tubes the appearance of a "square". The individual tubes are loaded with neutron absorber materials and the panels are configured into a cruciform shaped cross section which allows the control rod to move between fuel bundles. The square-shaped tubes require proper side-by-side alignment to get an even weld prep for welding and maintaining overall thickness. As already mentioned, the desired alignment is achieved using rollers above and below the tube array. As long as the tubes are relatively straight and are not twisted, the pressure from the rollers does not cause the tubes to deform. In the event the tubes are not properly aligned, however, roller pressure can cause tube deformation.

DISCLOSURE OF THE INVENTION

It is the principal object of this invention to improve alignment and positioning of adjacent absorber tubes prior to welding. To this end, a male tab is positioned opposite a female slot on each tube, the tab and slot extending along the entire length of the adjacent tubes. During assembly, the tab is engaged within the slot to properly align and orient the tubes relative to each other. The tab-slot arrangement may provide both alignment as well as interlocking functions, and in one exemplary embodiment, the latter function is achieved by forming the tab/slot as a dovetail joint. This configuration greatly reduces the fixturing requirements for assembly and, in addition, the interlocking configuration has some load carrying capability which reduces weld penetration requirements. This reduction in weld penetration eliminates other assembly concerns.

In another embodiment of the invention, the tab/slot configuration does not involve undercuts as found in a dovetail joint, so that only an alignment function is obtained.

In its broader aspects, therefore, the present invention provides a control rod assembly for a nuclear reactor, wherein a plurality of absorber tubes are arranged and welded in a side-by-side array, the improvement wherein each absorber tube is formed with an elongated slot extending substantially the entire length of the absorber tube on one side of the tube, and with an elongated tab extending substantially the entire length of the absorber tube on a diametrically opposed side of the tube such that, for adjacent absorber tubes, a joint is formed wherein the tab of one tube is located within the slot of the other.

In another aspect, the invention provides a method of preparing a plurality of neutron absorber tubes for welding into a substantially planar panel comprising the steps of:
a) providing a plurality of hollow absorber tubes, each of which has a plurality of flat sides extending substantially the entire length thereof;
b) for each tube, forming an elongated slot in one of the flat sides, the slot extending the length of the one side;
c) for each tube, forming an elongated tab or rib in a diametrically opposed flat side, the tab or rib extending the length of the diametrically opposed side;
d) aligning the plurality of tubes such that the tabs of one tube are seated within a corresponding slot of an adjacent tube; and
e) passing tubes aligned as in step d) through a pair of fixture rollers.

Other objects and advantages of the subject invention will become apparent from the detailed description which follows.

BEST MODE FOR CARRYING OUT THE INVENTION

Figure 1:
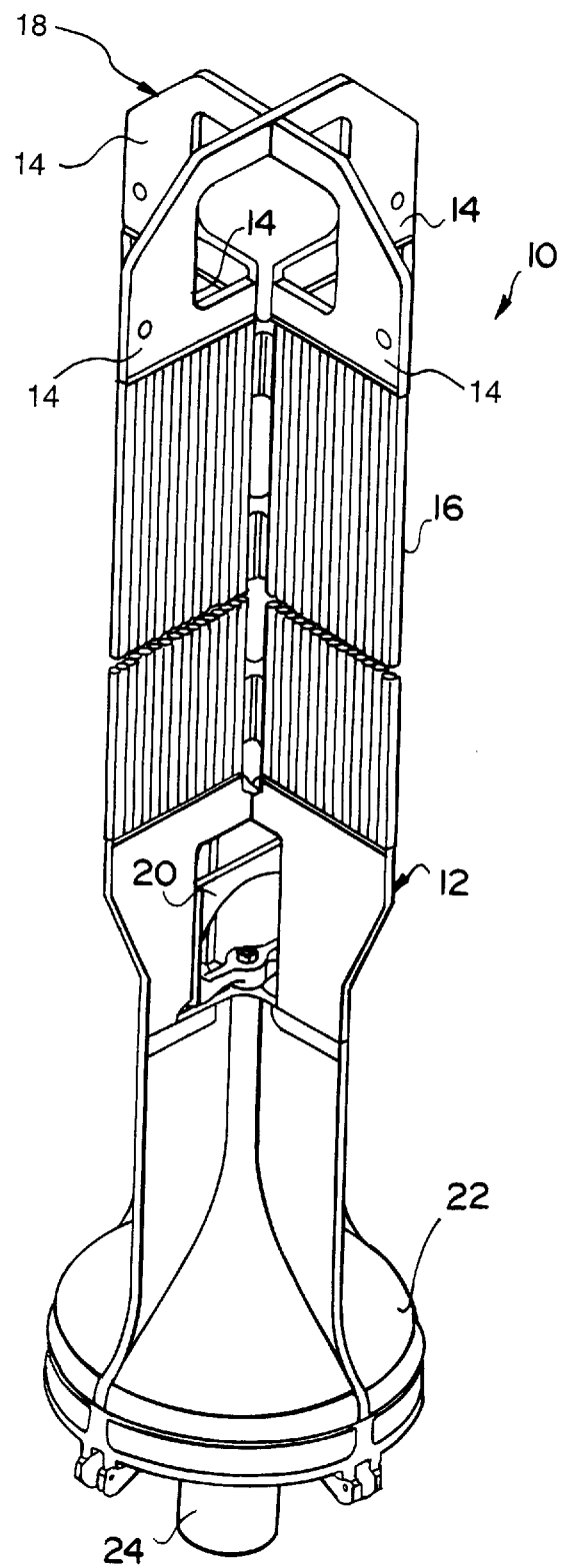
FIG. 1 is a perspective view of a conventional control rod assembly for a nuclear reactor.

Referring now the drawings, and particularly to FIG. 1, there is illustrated a control rod assembly 10 of conventional construction. The control rod assembly includes a generally cruciform control body 12, with each wing 14 of the cruciform shaped body 12 including a plurality of elongated absorber tubes 16 extending substantially parallel to the longitudinal axis of the control rod. As will be explained below, the tubes 16 are welded in side-by-side relationship, and individual tube panels are then assembled as shown in the Figure. The control rod assembly 10 also includes a handle 18, a coupling release handle 20 and a velocity limiter 22 along with a coupling socket 24. It will be appreciated that the control rod is adapted for insertion between fuel channels containing fuel bundles arranged in quadrants, such that the perpendicularly related wings 14 of the control rod lie adjacent the corresponding sides of a fuel channel.

The neutron absorber tubes 16 contain neutron absorbing material in the form of round hafnium rods and/or round boron carbide filled capsules. Typically, capsules (typically constructed of stainless steel) of the same or different length may contain the boron carbide material in powder form, while the upper end of the tube may be closed by a short rod formed of another neutron absorbing material, i.e., hafnium. The individual capsule segments may be of the same or different lengths and preferably have uniform loadings of neutron absorbing material, although non-uniform loadings may also be employed.

Figure 2:
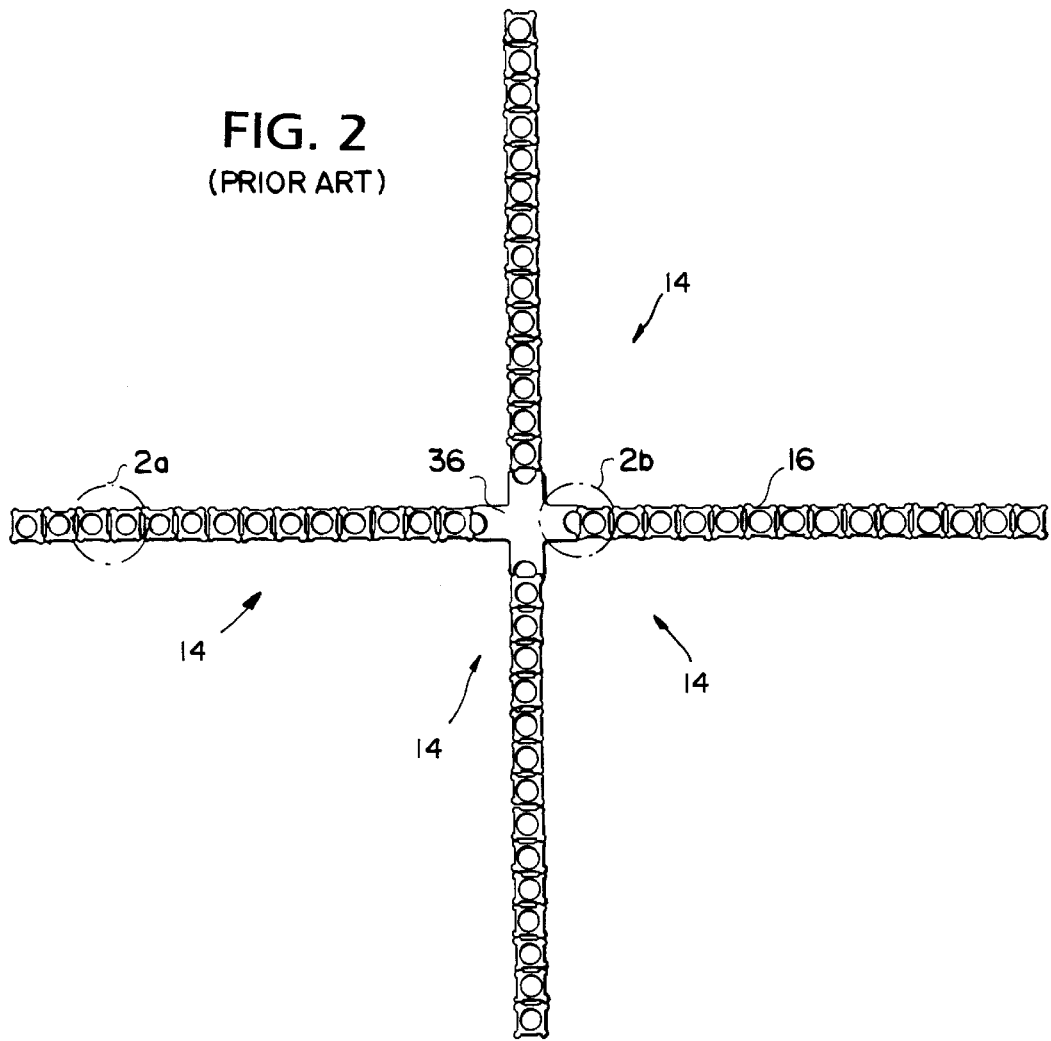
FIG. 2 is a partial cross section in plan, showing a plurality of absorber tubes in a conventional cruciform configuration.
Figure 2A:
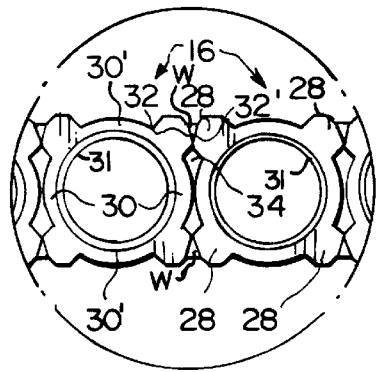
FIG. 2a is an enlarged detail from FIG. 2.
Figure 2B:
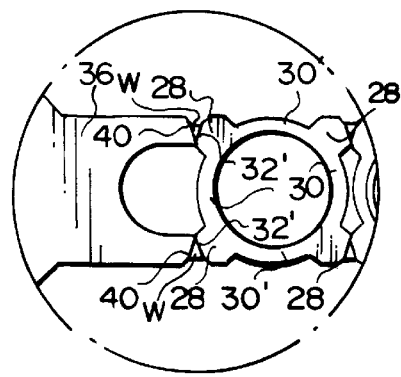
FIG. 2b is another enlarged detail from FIG. 2.

Turning now to FIG. 2, and particularly to enlarged details 2a and 2b, each elongated absorber tube 16 is currently of substantially round design, but formed to include four equally spaced exterior projections or lobes 28 which imparts to the external shape of the tube, a substantially "square" configuration. The four lobes 28 are interconnected by ligaments 30, 30' of substantially identical length and thickness. The absorber tube 16 has a round interior space which is filled with similarly shaped boron carbide filled capsules 31 (shown only in FIG. 2a) and/or hafnium rods. Adjacent absorber tubes 16 are welded together at W, between lobe surfaces 32, 32', leaving a closed space or plenum 34 between adjacent absorber tubes. At the center core 36 of the control rod, an absorber tube 16 is welded to the adjacent core projection 38 as best seen in the enlarged detail 2b. Thus, the lobe surfaces 32' are welded to adjacent surfaces 40 provided on the projection 38. An example of this type of absorber tube construction may be found in commonly owned U.S. Pat. No. 4,861,544.

Figure 3:
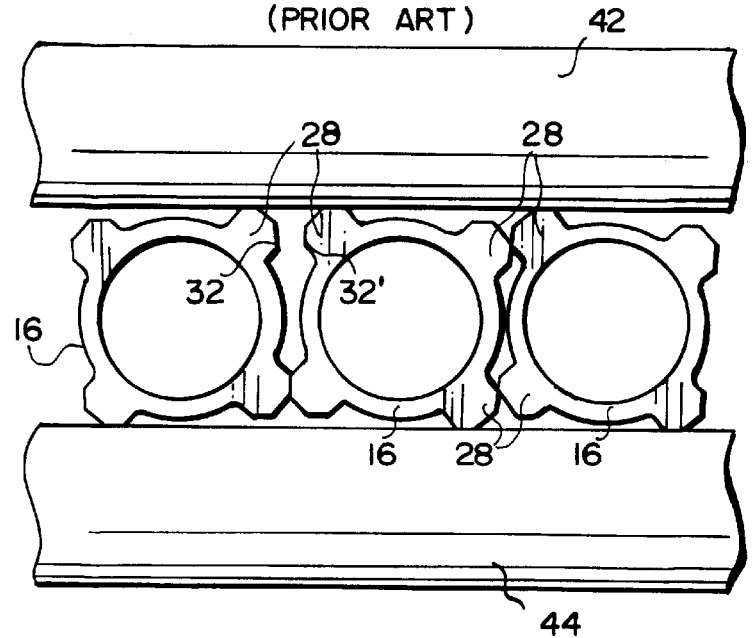
FIG. 3 is a partial side elevation illustrating the manner in which fixture rollers are utilized to align a plurality of conventional absorber tubes.

Turning to FIG. 3, a plurality of the conventional absorber tubes 16 of the design shown in FIG. 2 are shown interposed between a pair of conventional fixture rollers 42, 44 which are utilized to align the tubes in side-by-side relationship prior to welding the tubes in panel form (see FIG. 1). It will be understood that the tubes as shown in FIG. 3 travel in a direction parallel to their longitudinal axes, and thus perpendicular to the axes of rollers 42, 44. In a typical setup, roll pairs may be located on either side of a laser weld station, and the tubes are advanced until a weld location is situated at the laser weld station. After the weld is completed, the tubes are advanced until the next weld location is similarly situated. It can thus be appreciated that the alignment function of the roller pairs is critical to high quality welds.

The conventional tube design shown in FIG. 3 can result in separation and misalignment between adjacent tubes, particularly where surfaces 32, 32' of adjacent lobes 28 are to abut, allowing the fixture rollers to apply twisting moments to the adjacent tubes, as illustrated in the Figure. This kind of misalignment can cause tube deformation and/or poor quality welds.

Figure 4:
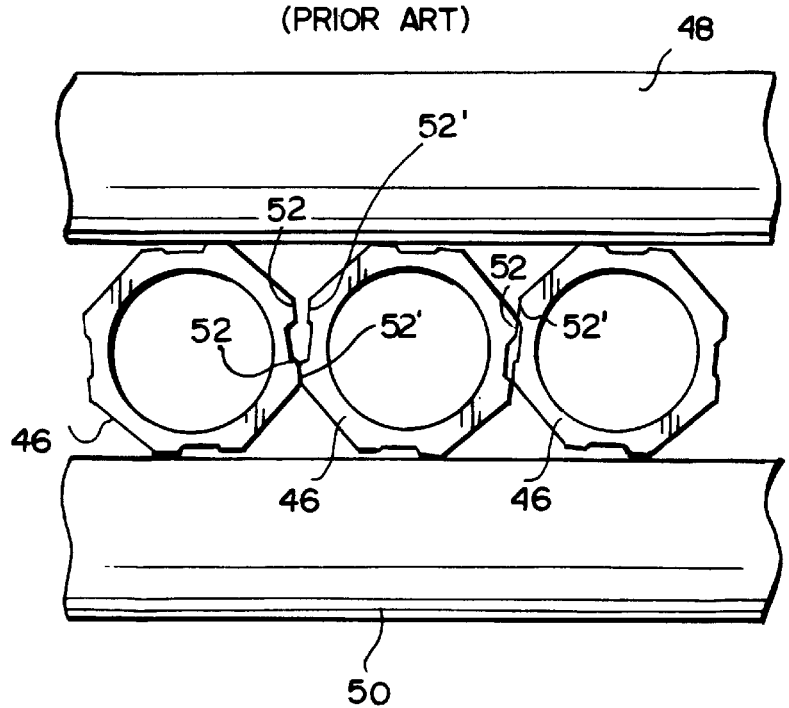
FIG. 4 is a partial side elevation illustrating the use of rollers to align a plurality of absorber tubes of a different but also a known design.

FIG. 4 illustrates a newer but also known absorber tube design which nevertheless also raises concerns with respect to the ability of the fixture rollers to properly align the tubes prior to welding. In this tube configuration, the absorber tubes 46 are between fixture rollers 48, 50. The absorber tubes have a generally hexagonal exterior shape, with welds to be located at adjacent flush surfaces 52, 52' but again, misalignment of these surfaces as illustrated can lead to tube deformation as a result of forces exerted by the rollers, and to poor quality welds. While separation between tubes 46 is reduced as compared to the arrangement shown in FIG. 3, the tube cross section is less rigid, and thus also has the potential for unwanted tube deformation. Even with the same roller-to-roller distance between the tubes, tubes can be mismatched to the extent that the tube prep or panel is locked between two adjacent tubes in an improperly aligned position as shown to the right in FIG. 4. In this instance, roller pressure will almost certainly deform the mismatched tube or tubes.

Figure 5:
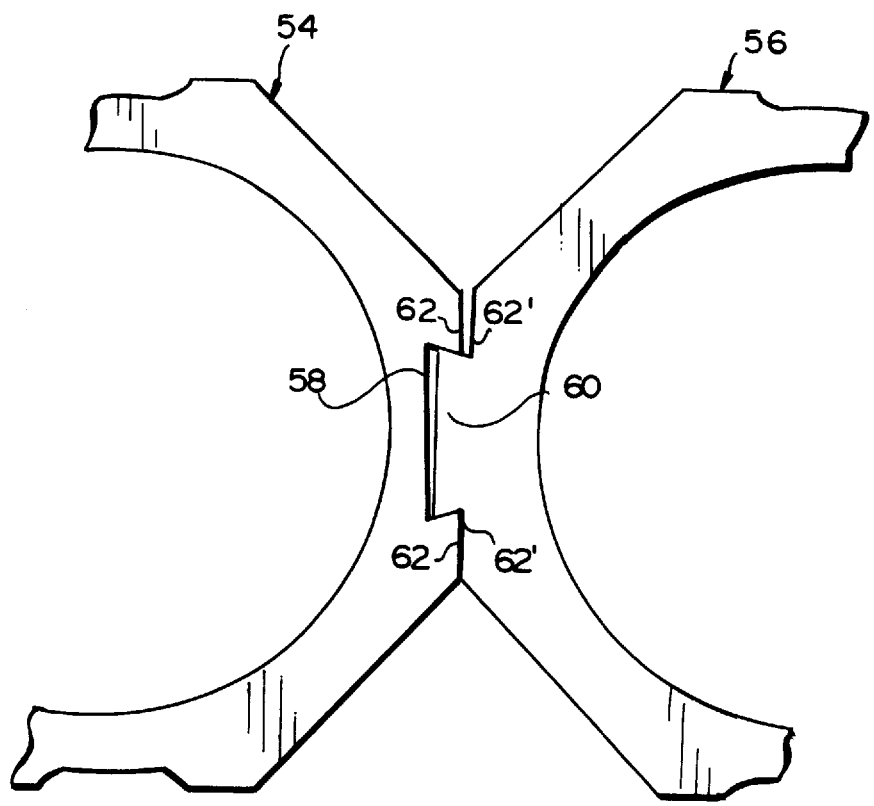
FIG. 5 is a partial side elevation illustrating in detail the preferred tab and slot configuration in accordance with this invention.

With reference now to FIG. 5, a new absorber tube interlocking design in accordance with the present invention is illustrated. Adjacent absorber tubes 54, 56 are shown, with one side of tube 54 formed with an elongated slot or groove 58, extending the entire length of the tube. Tube 56 is formed with a complementary shaped tab or projection 60 which is sized and shaped to mate with the slot or groove 58 in tube 54. It will thus be appreciated that the tubes 54, 56 (and others in the panel) are identical, and that each is formed with a slot or groove 58 on one side and a tab or rib 60 on a diametrically opposed side so that for each adjacent tube pair, a joint is formed wherein the tab or rib 60 of one is seated within the slot or groove 58 of the other. The tab and slot arrangement may be in the form of a conventional dovetail joint as shown, but other arrangements are applicable as well. In this configuration, welds are to be located between the abutting surfaces 62, 62' on either side of the dovetail joint. It should also be noted that the closed plenum between adjacent tubes has been eliminated.

Figure 6:
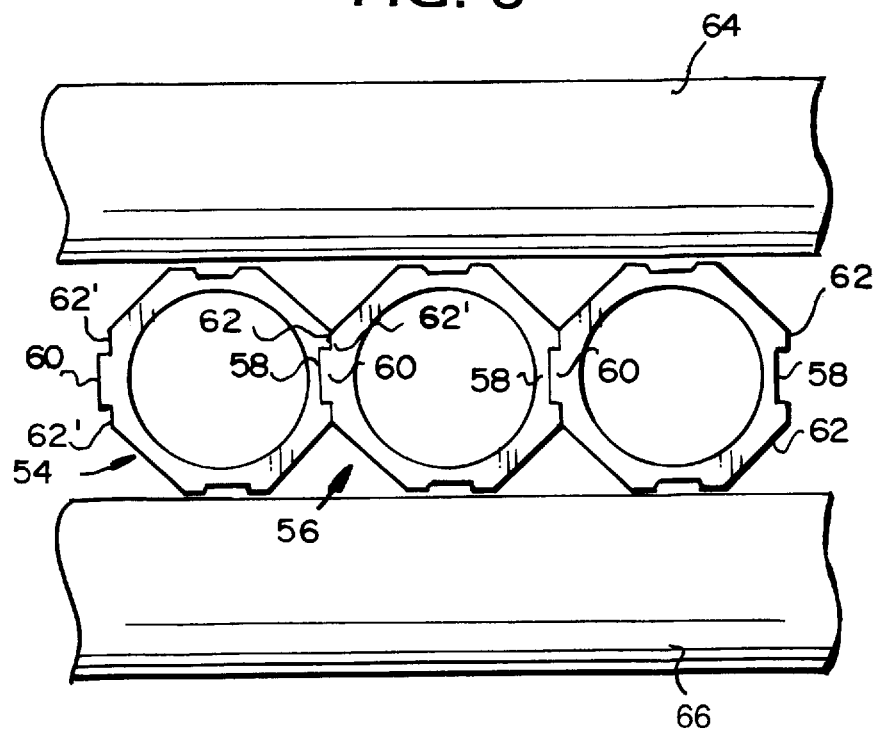
FIG. 6 is a partial side elevation illustrating the manner in which a pair of fixture rollers are employed in connection with a plurality of absorber tubes incorporating the subject matter of this invention.

FIG. 6 illustrates that when the tubes 54, 56 are assembled (along with other similar tubes) with the tab of one tube inserted within the slot of an adjacent tube, relatively little movement is permitted as between the adjacent tubes as a result of forces exerted by rollers 64, 66. In addition, the interlocking tab and slot configuration provides a positive connection between the adjacent tubes, limiting rotation and mismatch between the tubes. The dovetail design illustrated in FIGS. 5 and 6 also provides structural benefits as well to the panel formed by a plurality of such tubes.

Figure 7:
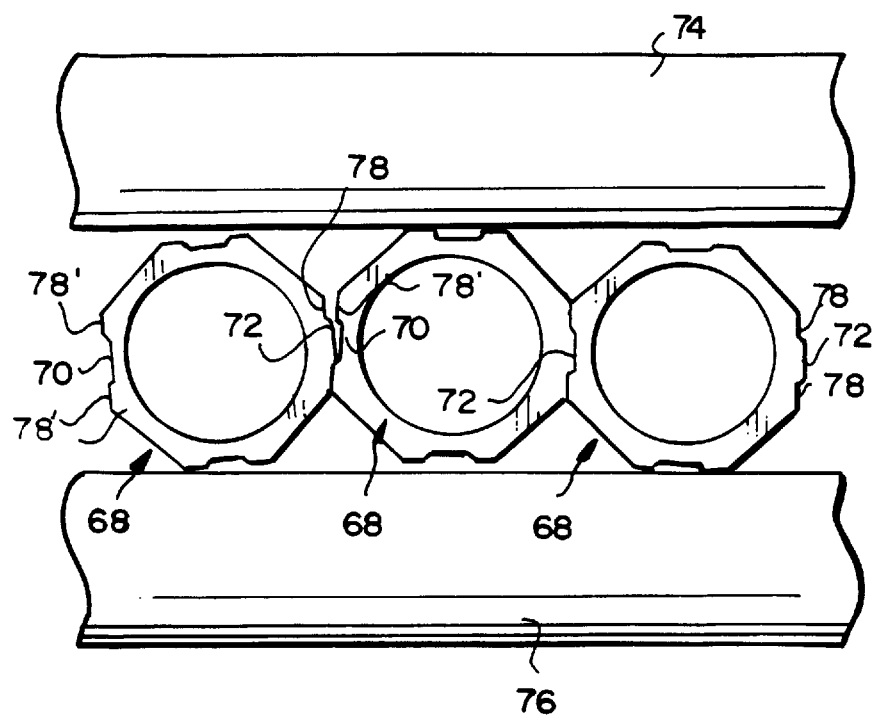
FIG. 7 is a partial side elevation similar to FIG. 6 but illustrating an absorber tube design in accordance with a second exemplary embodiment of the invention.

In another embodiment of the subject invention, as shown in FIG. 7, a less pronounced slot and tab design is illustrated. With this design, diametrically opposed exterior walls of adjacent tubes 68 are formed with slots and tabs 70, 72, respectively, which engage when adjacent tubes are aligned in proper side-by-side relationship. With this configuration, there is a self-aligning feature, but it is not interlocking. In other words, the design shown in FIG. 7 does not include the undercut surfaces of a dovetail joint as shown in FIGS. 5 and 6. This configuration is less likely to have mismatches between tubes and, even though no positive structural connection between the tubes exists, the relative rotation between the tubes during alignment under the influence of the fixture rollers 74 and 76, is reduced, resulting in a more consistent weld joint configuration between surfaces 78 and 78'.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of preparing a plurality of neutron absorber tubes for welding into a substantially planar panel of a nuclear reactor control rod comprising the steps of:

a) providing a plurality of hollow neutron absorber tubes, each of which has a plurality of flat sides extending substantially the entire length thereof;

b) for each tube, forming an elongated slot in one of said flat sides, said slot extending the length of said one side;

c) for each tube, forming an elongated tab or rib in a diametrically opposed flat side, said tab or rib extending the length of said diametrically opposed side;

d) aligning said plurality of tubes such that the tabs of one tube are seated within a corresponding slot of an adjacent tube; and e) passing tubes aligned as in step d) through a pair of fixture rollers to further align said plurality of tubes in preparation for welding.

2. The method of claim 1 wherein said slots and tabs have a substantially dovetail shape.

3. The method of claim 1 wherein adjacent tubes are interlocked.

4. The method of claim 1 wherein each tube has flat surfaces on either side of said tab and said slot, and further wherein adjacent tubes are welded where said flat surfaces of one tube engage flat surfaces of an adjacent tube.

5. The method of claim 1 wherein said tab and slot are configured to provide a structural joint.

* * * * *